United States Patent [19]

Wakita et al.

[11] Patent Number: 4,642,260

[45] Date of Patent: Feb. 10, 1987

[54] SUBSTRATE FOR PLANOGRAPHIC PLATE

[75] Inventors: Kazuto Wakita; Kazuo Tsuchiya; Isao Nagayasu; Ikuo Emoto, all of Sakai, Japan

[73] Assignee: Ube Industries, Ltd., Ube, Japan

[21] Appl. No.: 711,965

[22] Filed: Mar. 14, 1985

[30] Foreign Application Priority Data

Mar. 21, 1984 [JP] Japan ................................. 59-52205

[51] Int. Cl.[4] ......................... B32B 7/02; B32B 15/08

[52] U.S. Cl. .................................... 428/215; 428/324; 428/448; 428/450; 428/461

[58] Field of Search ............... 428/461, 215, 216, 324, 428/447, 450, 448

[56] References Cited

U.S. PATENT DOCUMENTS 4,424,254 1/1984 Hedrick et al. ................ 428/461 X 4,477,513 10/1984 Koga .............................. 428/461 X 4,533,602 8/1985 Nakamura et al. ............ 428/461 X

FOREIGN PATENT DOCUMENTS 51-41362 4/1975 Japan .................................. 428/216

*Primary Examiner*—Thomas J. Herbert

*Attorney, Agent, or Firm*—Frishauf, Holtz, Goodman & Woodward

[57] ABSTRACT

Disclosed is a substrate for planographic (lithographic) plate, which comprises metal foils with thicknesses of 5 to 100μ laminated onto both surfaces of a sheet which has a thickness of 30 to 400μ, said sheet being obtained by sheet making of a modified polyolefin composite material comprising 100 parts by weight of a modified polyolefin resin graft-modified partially or wholly with an organic silane compound and 5 to 150 parts by weight of mica.

18 Claims, No Drawings

SUBSTRATE FOR PLANOGRAPHIC PLATE

BACKGROUND OF THE INVENTION

This invention relates to a substrate for planographic (lithographic) plate having excellent printing aptitude and printing resistance.

In general, metals such as aluminum or stainless steel sheets have been employed as a substrate for planographic plate.

However, a substrate for planographic plate of a metallic single substance is heavy with poor workability and also expensive.

Accordingly, a printing plate structure with an aluminum sheet (foil) laminated on one surface of a thermoplastic resin sheet has been proposed (Japanese Patent Publication No. 41362/1976).

However, the substrate by use of one-surface metal foil laminated sheet is liable to be curled, and the printing plate by use of this sheet is also poor in printing resistance and printing aptitude, thus failing to be suitable for a printing substrate.

Accordingly, for suppression of generation of curl in the one-surface metal foil laminated sheet, a substrate for planographic plate by use of a sheet prepared from a mixture of a polyolefin resin and an inorganic filler as a thermoplastic resin sheet was proposed.

However, such a substrate for planographic plate proved to involve the problem that the printing plate by use of this sheet is poor in printing resistance, particularly in printing resistance in multiple printing (e.g. multicolor printing) in which some tens of thousands sheets are to be printed, and therefore limited in uses.

SUMMARY OF THE INVENTION

The present inventors have studied intensively to provide a substrate for planographic plate by combination of a thermoplastic resin sheet and a metal foil, not having the problem mentioned above, and consequently accomplished the present invention.

More specifically, the present invention concerns a substrate for planographic plate, which comprises metal foils with thicknesses of 5 to 100μ laminated onto both surfaces of a sheet which has a thickness of 30 to 400μ, said sheet being obtained by sheet making of a modified polyolefin composite material comprising 100 parts by weight of a modified polyolefin resin graft-modified partially or wholly with an organic silane compound and 5 to 150 parts by weight of mica.

DESCRIPTION OF THE PREFERRED EMBODIMENTS

In the present invention, by using a sheet with a thickness of 30 to 400 μ obtained by sheet making of a modified polyolefin composite material comprising 100 parts by weight of a modified polyolefin resin graft-modified partially or wholly with an organic silane compound and 5 to 150 parts by weight of mica as the resin sheet to be laminated with metal foils, printing resistance and printing aptitude of a substrate for planographic plate can be improved without generation of curl.

The polyolefin resin to be used for obtaining the above modified polyolefin resin may include crystalline homopolymers of propylene, crystalline random or block copolymers of propylene with ethylene or other α-olefins (e.g. butene-1, pentene, hexene, heptene, octene-1, etc.), propylene resins such as crystalline terpolymers of propylene, ethylene and other α-olefins, ethylene homopolymers with a density of 0.93 g/cm$^3$ or more and copolymers of ethylene with α-olefins, preferably polypropylene resins. The polyolefin resin typically has a melt flow rate index (MFR) of 3 to 30 g /10 min. and may preferably have a melt flow rate index (MFR) of 0.1 to 100 g/10 min. corresponding to a molecular weight of about $7.0\times10^5$ to $8.0\times10^4$, respectively.

As the above organic silane compound, there may be mentioned a silane compound having an unsaturated bond, such as vinyl triethoxysilane, methacryloyloxy trimethoxysilane, γ-methacryloyloxy propyltrimethoxysilane, methacryloyloxy cyclohexyltrimethoxysilane, γ-methacryloyloxy propyltriacetyloxysilane, methacryloyloxy triethoxysilane, γ-methacryloyloxy propyltriethoxysilane and the like. These organic silane compounds may be used either alone or as a mixture of two or more compounds.

The modified polyolefin resin to be used in the present invention is prepared by the graft reaction of at least a part of the above polyolefin resins with an organic silane compound, preferably in the presence of an organic peroxide.

The above organic peroxide may preferably be one with a one minute half-life period temperature of about 160° to 260° C., and such organic peroxides may include, for example, tert-butyl peroxyisopropyl carbonate, di-tert-butyl diperoxyphthalate, tert-butyl peroxyacetate, 2,5-dimethyl-2,5-di(tert-butylperoxy)hexane, 2,5-dimethyl-2,5-di(tert-butylperoxy)hexyne-3, tert-butyl peroxylaurate, tert-butyl peroxymaleic acid, tert-butyl peroxybenzoate, methyl ethyl ketone peroxide, dicumyl peroxide, cyclohexanone peroxide, tert-butyl cumyl peroxide, 2,5-dimethylhexane 2,5-dihydroperoxide and the like. These organic peroxides may be used either singly or as a mixture of two or more compounds.

The modified polyolefin resin may be prepared preferably by mixing 100 parts by weight of a polyolefin resin, preferably a polypropylene resin, 0.01 to 5 parts by weight, preferably 0.05 to 3 parts by weight, of an organic silane compound and 0.01 to 5 parts by weight, preferably 0.05 to 2 parts by weight, of an organic peroxide and heating the resultant mixture to as temperature of 160° to 270° C., preferably 180° to 270° C. to effect grafting. The most simple heat treatment operation may be conducted by melt heating of the above mixture in an extruder at the above temperature from about 1 to 10 minutes. Particularly, there may preferably be used a modified polypropylene having an MFR of 10 to 80 g/10 min., which is obtained by graft modification of a polypropylene resin so as to have an MFR of 5 to 200 g/10 min., followed by crosslinking with water (including also water vapor). Water crosslinking means formation of a Si-O-Si linkage which is considered to be caused by elimination of methanol upon contact with water. The aforesaid water crosslinking (including also water vapor crosslinking) can be achieved preferably by bringing the above modified polypropylene resin into contact with water vapor under an atmosphere containing water vapor (which may be also in the air) at 25° to 120°0 C. for one hour or longer, preferably 24 hours or longer. In the present invention, the above modified polyolefin alone or, more preferably, a mixture of the above modified polyolefin resin with an unmodified polyolefin resin (preferably having a MFR of 0.1 to 10 g/10 min.) may be used. When such a mixture is to be employed, it is preferred to mix 5 to 150 parts by weight of the modified polyolefin resin per 100 parts by weight of the unmodified polyolefin resin. The thus obtained modified polyolefin resin subjected partially or wholly to graft modification with an organic silane compound should preferably have a MFR of 0.3 to 80 g/10 min., particularly preferably 0.3 to 10 g/10 min. from the standpoint of moldability and the physical properties of the sheet.

In the present invention, mica such as common mica (potashmica or muscovite), biotite, phlogopite and synthetic mica (artificial mica) is employed as the inorganic filler. Among them, phlogopite may preferably be used. The mica to be used in the present invention should preferably have a mean size (weight average mean value) of 10 to 280μ, with a mean aspect ratio of 15 to 70, particularly containing 2 wt. % or less of flakes with diameters of 600μ or more. The mica may be subjected to the surface treatment with a surface treating agent such as aminosilane. The amount of mica to be formulated may be 5 to 150 parts by weight, preferably 10 to 150 parts by weight, particularly preferably 20 to 100 parts by weight, per 100 parts by weight of the modified polyolefin resin graft-modified partially or wholly with a silane compound. If the amount of mica formulated is less than 5 parts by weight, the effect of improvement of printing resistance of the substrate for planographic plate is small, while an amount in excess of 150 parts by weight will contrariwise lower printing resistance.

The substrate for planographic plate of the present invention can be obtained by, for example, laminating metal foils with a thickness of 5 to 100μ, preferably 10 to 50μ, directly or through an adhesive onto both surfaces of a sheet which has a thickness of 10 to 400μ, preferably 100 to 280μ, prepared by sheet making of a modified polyolefin composite material comprising a mixture obtained by heating the above modified polyolefin resin or the modified polyolefin resin and unmodified polyolefin resin together with mica (the polyolefin resin may be graft-modified by a silane compound during mixing of the polyolefin resin with mica). The laminated substrate should preferably have a thickness of 100 to 500μ and a weight of 0.6 $Kg/m^2$ or less.

As the above metal foils, there may be used aluminum and stainless foils on both surfaces, and there may preferably be employed aluminum foils. Particularly, it is preferred to use rigid aluminum foils with an elongation of 3% or less.

The above adhesive may be any of the solution type, the emulsion type and the hot melt type, as exemplified by epoxy resin, chlorinated polypropylene, polyurethane, modified polyolefin resin, ethylene-vinyl acetate copolymer, ionomer resin, epoxidized 1,2-polybutadiene, etc.

In the present invention, a photosensitive resin layer is provided on at least one surface of the metal foils laminated on both surfaces of the sheet obtained by sheet making of the above composite material (resin sheet) and used as the planographic plate (printing plate).

In laminating these metal foils, respective treatments of (sand) blasting of the surface et seq may be conducted, followed by coating of the photosensitive resin to prepare a planographic plate (printing plate). Alternatively, the surface of the metal foils may be subjected to (sand) blasting and, in some cases, further subjected to pre-treatments such as anodic oxidation treatment or various hydrophilic treatments before lamination of the metal foils, followed by coating with the photosensitive resin to prepare a planographic plate. It is also possible to apply the pre-treatments of (sand) blasting et seq and the photosensitive resin coating before lamination to prepare a planographic plate. Further, it is possible to apply the pre-treatments of (sand) blasting et seq and the photosensitive resin coating, followed by cutting of the coated product to suitable sizes, which are then laminated after the plate manufacturing steps to prepare a planographic plate.

As the method for laminating metal foils on both surfaces of the resin sheet, there may be employed the two-step roll method in which an adhesive is first applied on one surface of a metal foil or a resin sheet and a composite of three layers of metal foil/adhesive/resin sheet is passed through pressure rollers and then the other metal foil is laminated similarly on the resin sheet surface of the three layer, or the one-step roll method in which the above respective layers are laminated at once.

The substrate for planographic plate of the present invention has the advantages of it being difficult to generate curl, combined with substantially equal performance as compared with the substrate of a single metal and excellent working properties with light weight.

In the following Examples, parts mean parts by weight.

EXAMPLE 1

A mixture of 100 parts of a crystalline polypropylene homopolymer having a MFR of 9.0 g/10 min. with 0.5 parts of γ-methacryloyloxy propyltrimethoxysilane and 0.25 parts of t-butylperoxy benzoate was subjected to heating decomposition in an extruder at a resin temperature of 220° C. The modified polypropylene obtained immediately after the modification (MFR 100 g/10 min.) was subjected to water crosslinking in the air at 80° C. for about 3 days. 14 Parts of the pellets (2 mmφ×3 mm) of the resultant modified polypropylene (MFR 50 g/10 min.), 56 parts of pellets (2 mmφ×3 mm) of a crystalline polypropylene homopolymer (MFR 0.5 g/10 min.) (further 0.1 phr of BHT, 0.1 phr of Irganox 1010 (trade name, produced by Ciba-Geigy of Japan) and 0.2 phr of calcium stearate were added] and 30 parts of mica [Suzorite mica 325HK, mean particle size 20μ, mean aspect ratio 20-25, containing 1 wt. % or more of flakes of 100ρ or more, (produced by Kuraray K.K.)] were mixed homogeneously by means of a continuous biaxial kneading machine, FCM (produced by Kobe Seikosho K.K.) at 200° C. to obtain a composite material.

This material was formed into a sheet, according to the T-die method, by use of a sheet molding machine, NRM (produced by Mitsubishi Jyukogyo K.K.) at a molding temperature of 200° C. to obtain a sheet with a thickness of 240μ and a width of 1 m. The mechanical properties of the thus obtained sheet are:

tensile strength: 3.96 $kg/mm^2$ (MD), 3.82 $kg/mm^2$ (TD)
elongation: 10% (MD), 4% (TD)
tensile modulus of elasticity: 310 $kg/mm^2$ (MD), 291 $kg/mm^2$ (TD)

On both surfaces of this sheet, aluminum foils with a thickness of 30μ (elongation 2.0%, rigid 1N30H) were laminated with the use of an urethane type adhesive (5 $g/m^2$ on front surface, 10 $g/m^2$ on back surface) according to the roll method to obtain a sheet laminated on both surfaces with aluminum foils with a thickness of about 300μ and a weight of about 0.4 $kg/m^2$.

For the laminated sheet which was cut into pieces having a size of 560 mm×670 mm, evaluation as a substrate for planographic plate were conducted according to the following method.

EVALUATION METHOD

The aluminum surface on the front side (mirror surface side) of the laminated sheet was subjected to sand blasting working with the use of abrasives of appropriate particle sizes (surface coarseness: about 1.5μ) and hydrophilic treatment, and then a commercially available photosensitive resin was applied thereon to prepare a planographic plate.

For this planographic plate, printing resistance test was conducted in an off-set printing machine under the following conditions.

1. Preparation of plate (i) Exposure: Ultra-high pressure mercury lamp 2 KW;
(ii) Developing: Sakura PS plate automatic developing machine 860 A (produced by Konishiroku Photo Industry Co., Ltd.); Developer: Sakura SDP-1 (produced by Konishiroku Photo Industry Co., Ltd.)

2. Printing machine test method (i) Printing machine: 480 K off-set printing machine (produced by Ryobi K.K.); Ink: four colors of process red, yellow, blue and black.
(ii) Printing speed: 10000 rpm.

Printing resistance was evaluated from the changes in dot area and dot density at the shadow portion and the highlight portion of the printed product and further from the reflected density change at the gray scale portion.

From the beginning of printing to printing of 50000 sheets, no such phenomenon as slendering of dots or lowering in ink attachment at image lines was recognized at all, and good printing aptitude was retained.

During printing, "badness percentage" due to breaking at the nip portion on mounting of the printing plate on printing rolls was found to be 0% (tested for each of 5 sheets).

EXAMPLE 2

A composite material was obtained in the same manner as in Example 1 except that the formulated ratios of the respective components were changed as 14 parts for the modified polypropylene (MFR 50 g/10 min.), 36 parts for the crystalline polypropylene homopolymer (MFR 0.5 g/10 min.) and 50 parts for the mica (325 HK).

By use of this composite material, a laminated sheet (substrate for planographic plate) and then a planographic plate were prepared similarly as in Example 1. The mechanical properties of the thus obtained sheet are:

tensile strength: 4.18 kg./mm$^2$ (MD), 3.94 kg/mm$^2$ (TD)
elongation: 5% (MD), 3% (TD)
tensile modulus of elasticity: 425 kg/mm$^2$ (MD) 418 kg/mm$^2$ (TD)

When printing resistance test was conducted for this planographic plate similarly as described in Example 1, good printing aptitude was found to be retained without any phenomenon such as slendering of dots, lowering in ink attachment at image lines, etc. from the beginning of printing to 50000 sheets of printing.

The badness percentage due to breaking at the nip portion during printing was found to be 0% (tested for each of 5 sheets).

COMPARATIVE EXAMPLE 1

As the composite material, a crystalline polypropylene homopolymer was employed. The mechanical properties of the sheet are as follows:

tensile strength: 3.83 kg/mm$^2$ (MD), 3.84 kg/mm$^2$ (TD)
elongation: 430% (MD), 520% (TD)
tensile modulus of elasticity: 147 kg/mm$^2$ (MD), 139 kg/mm$^2$ (TD)

On one surface of the sheet with a thickness of 270μ obtained by sheet making of the polymer was laminated an aluminum foil with a thickness of 30μ by use of an urethane type adhesive to obtain a laminated sheet laminated on one surface with aluminum foil with a thickness of about 300μ.

The laminated sheet was curled greatly, thus being unsuitable as a printing substrate, and therefore no printing resistance test was conducted.

COMPARATIVE EXAMPLE 2

As the composite material, a crystalline polypropylene homopolymer having the same mechanical properties as in Comparative example 1 was employed, and on both surfaces of the sheet with a thickness of 240μ obtained by sheet making of the polymer, aluminum foils with a thickness of 30μ were laminated according to the roll method by use of an urethane type adhesive to obtain a sheet laminated on both surfaces with aluminum foils with a thickness of about 300μ, from which a planographic plate was then prepared.

When printing resistance test was conducted for this planographic plate, slendering of dots was recognized locally from the beginning of printing, thus effecting the problem of printing resistance.

EXAMPLES 3 TO 5

Experiments for Examples 3 to 5 were conducted according to the same manner as in Example 1 except that as mica Suzorite mica 325S [mean particle size 40μ, mean aspect ratio 30, containing 1 wt. % or less of flakes of 210μ or more (produced by Kuraray K.K.)] was used in Example 3; Suzorite mica 325K-1 [a grade which has been obtained by subjecting 325S to surface treatment thereof with an aminosilane (produced by Kuraray K.K.)] in Example 4; and Suzorite mica 350K-1 [a grade which has been obtained by subjecting 325HK to surface treatment thereof with an aminosilane (produced by Kuraray K.K.)] in Example 5, respectively, in place of Suzorite mica 325HK.

These Examples provided good results which are almost the same as in Example 1.

As described above, according to the present invention, it is possible to obtain a substrate for planographic plate which is light in weight and easy in handling, and has excellent printing aptitude and printing resistance.

We claim:

1. A substrate for planographic plate, consisting essentially of metal foils with thicknesses of 5 to 100μ laminated onto both surfaces of a sheet which has a thickness of 30 to 400μ, said sheet being formed of a modified polyolefin composite material comprising 100 parts by weight of a modified polyolefin resin graft-modified partially or wholly with an organic silane compound and 5 to 150 parts by weight of mica.

2. The substrate for planographic plate according to claim 1, wherein the amount of the mica is 20 to 100 parts by weight.

3. The substrate for planographic plate according to claim 1, wherein the modified polyolefin resin is a modified crystalline homopolymer of propylene, a crystalline random or block copolymer of propylene with an α-olefin, a crystalline terpolymer of propylene, ethylene and another α-olefin, an ethylene homopolymer with a density of at least 0.93 g/cm$^3$ or a copolymer of ethylene and another α-olefin.

4. The substrate for planographic plate according to claim 1, wherein the modified polyolefin resin is a modified polypropylene resin.

5. The substrate for planographic plate according to claim 4, wherein the metal foils are aluminum foils, the mica has a mean size of 10 to 280μ and a mean aspect ratio (mean size/mean thickness) of 15 to 70 and wherein the organic silane compound is vinyl triethoxysilane, methacryloyloxy trimethoxysilane, γ-methacryloyloxy propyltrimethoxysilane, methacryloyloxy cyclohexyltrimethoxysilane, γ-methacryloyloxy propyltriacetyloxysilane, methacryloyloxy triethoxysilane or γ-methacryloyloxy propyltriethoxysilane.

6. The substrate for planographic plate according to claim 5, wherein the aluminum foils have a thickness of 10 to 50μ and a tensile elongation of 3% or less.

7. The substrate for planographic plate according to claim 6, wherein the mica has a mean size of 20 to 50μ and a mean aspect ratio (mean size/means thickness) of 20 to 40 and the amount of the mica is 20 to 100 parts by weight.

8. The substrate for planographic plate according to claim 7, wherein said sheet has a thickness of 100 to 280μ.

9. The substrate for planographic plate according to claim 8, wherein the modified polypropylene resin is a modified crystalline homopolymer of propylene, a crystalline random or block copolymer of propylene with an α-olefin or a crystalline terpolymer of propylene, ethylene and another α-olefin.

10. The substrate for planographic plate according to claim 8, wherein the organic silane compound is γ-methacryloyloxy propyltrimethoxysilane.

11. The substrate for planographic plate according to claim 1, wherein the metal foils are aluminum foils.

12. The substrate for planographic plate according to claim 11, wherein aluminum foils have a tensile elongation of 3% or less.

13. The substrate for planographic plate according to claim 1, wherein the metal foils have a thickness of 10 to 50μ.

14. The substrate for planographic plate according to claim 13, wherein said sheet has a thickness of 100 to 280μ.

15. The substrate for planographic plate according to claim 1, wherein the mica has a mean size of 10 to 280μ and a mean aspect ratio ( mean size/mean thickness) of 15 to 70.

16. The substrate for planographic plate according to claim 15, wherein the mica has a mean size of 20 to 50μ and a mean aspect ratio ( mean size/mean thickness) of 20 to 40.

17. The substrate for planographic plate according to claim 1, wherein the organic silane compound is vinyl triethoxysilane, methacryloyloxy trimethoxysilane, γ-methacryloyloxy propyltrimethoxysilane, methacryloyloxy cyclohexyltrimethoxysilane, γ-methacryloyloxy propyltriacetyloxysilane, methacryloyloxy triethoxysilane or γ-methacryloyloxy propyltriethoxysilane.

18. The substrate for planographic plate according to claim 17, wherein the organic silane compound is γ-methacryloyloxy propyltrimethoxysilane.

* * * * *